Feb. 23, 1960 K. N. FROMM 2,926,304
FREQUENCY DETERMINING SYSTEM
Filed April 21, 1958 2 Sheets-Sheet 1

INVENTOR.
KENNETH N. FROMM
BY
Gust & Irish
ATTORNEYS

United States Patent Office 2,926,304
Patented Feb. 23, 1960

2,926,304

FREQUENCY DETERMINING SYSTEM

Kenneth N. Fromm, Cincinnati, Ohio, assignor to International Telephone and Telegraph Corporation Application April 21, 1958, Serial No. 729,768

9 Claims. (Cl. 324—79)

The present invention relates to a frequency determining system and more particularly to a system for accurately determining the frequency of a signal in the microwave spectrum.

Among the prior methods of measuring or determining the frequency of a signal in the microwave region is one in which a relatively large number of bandpass filters arranged in seriatum are used to single out the signal whose frequency is to be measured. Knowing which of the filters is passing the signal gives one the information to determine the signal's frequency, the accuracy of this determination being dependent upon the width of the frequency-band passed by the particular filter. In such a system, and choosing some arbitrary figures for presenting an example, let it be assumed that it is desired to measure the frequency of a signal occurring between 4,000 and 5,000 megacycles. If it is desired to determine the accuracy of the frequency of the unknown signal to within ten (10) megacycles, a total of one hundred (100) bandpass filters, each having a ten (10) megacycle bandpass characteristic, are arranged in parallel relation, each filter covering a band of frequencies ten (10) megacycles wide and ten (10) megacycles higher in frequency than the preceding filter. With such an array of one hundred (100) filters, arranged to cover the microwave spectrum between 4,000 and 5,000 megacycles, a total bandwidth of 1,000 megacycles is covered. Assuming that the unknown signal has a frequency of 1,005 megacycles, and feeding this signal to the array of filters, it will be obvious that only the first filter, or in other words the lowest frequency filter, will pass the signal, since all of the other, higher frequency filters reject the signal. Knowing that only the lowest frequency filter is accepting the unknown signal provides one with information that the frequency of the unknown signal is between 1,000 megacycles and 1,010 megacycles, the width of the filter. Thus, a frequency measurement to within ten (10) megacycles is provided.

A principal objection to such a system for measuring frequency resides in the fact that a huge number of relatively expensive filters are needed to provide a measurement of relatively inaccurate result, thus contributing to an unwieldy and rather inefficient arrangement.

It is an object of this invention to provide a frequency-determining system for measuring with a predetermined degree of accuracy a signal occurring in the microwave frequency spectrum.

It is another object of the invention to provide a frequency-determining system for measuring the frequency of a microwave signal automatically.

It is still another object of this invention to provide a frequency-determining system for measuring the frequency of a microwave signal by heterodyning the unknown signal to produce a difference-frequency signal of relatively low frequency and then determining the frequency of said difference-frequency signal.

Yet another object of this invention is to provide a frequency-determining system which is more accurate, less expensive, and less complex than previous systems.

In accordance with one embodiment of this invention, there is provided a frequency-determining system comprising a plurality of bandpass filters which conjointly cover a first predetermined band of frequencies, said filters individually having response characteristics which cover different portions of said band respectively, heterodyning means associated with each filter for providing an intermediate frequency signal lying within a second predetermined band of frequencies, variable frequency means for generating a signal of variable frequency within said second band, means for mixing said variable frequency signal with said intermediate frequency signal to obtain a difference-frequency signal, and means responsive to said difference-frequency signal for controlling and determining the frequency of said variable frequency means whereby the frequency of said intermediate frequency signal can be determined. Such a system utilizes a bare minimum of bandpass filters, relying upon associated circuitry for ascertaining the frequency of the unknown signal.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
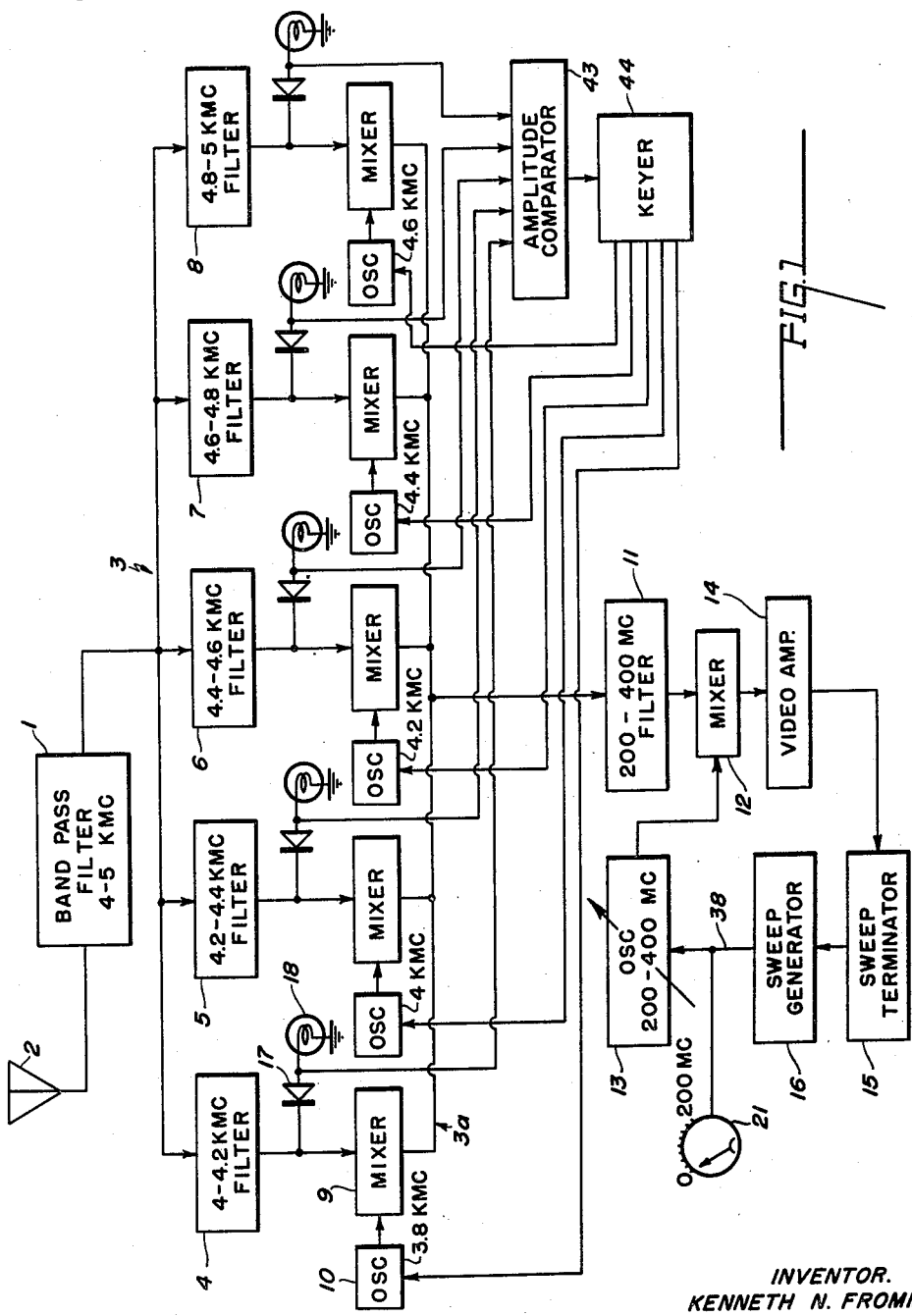
Fig. 1 is a block diagram of an embodiment of this invention.

Referring to the drawings, and more particularly to Fig. 1, the circuit comprises a receiver tuned to that portion of the microwave spectrum within which the frequency of an unknown signal is to be measured. By way of example only, in explaining the principles of this invention, the microwave frequency spectrum of 4,000 to 5,000 megacycles has been chosen; however, as will appear to a person skilled in the art, any desired range of frequencies may be covered by appropriate circuitry design without departing from the scope of this invention. A bandpass filter covering the frequency spectrum of from 4,000 to 5,000 megacycles has its input circuit coupled to a suitable antenna 2 and its output circuit to an array of five (5) filters, generally indicated by the reference numeral 3. These filters of the array are numbered 4, 5, 6, 7 and 8, respectively, and are designed to pass a band of frequencies only 200 megacycles wide, these filters reading from left to right in the drawing covering successively higher frequency bandwidths of 200 megacycles each. For example, filter number 4 covers the frequency range of 4,000–4,200 megacycles, filter 5 covers 4,200–4,400 megacycles, filter number 6 covering 4,400–4,600 megacycles, and filter 7 covering 4,600–4,800 megacycles, and filter 8 covering 4,800–5,000 megacycles.

Such filters may be of conventional design, having sharp cutoff characteristics at the low and high frequency ends so that a minimum of overlap between filters will exist.

Associated with each of the filters 4, 5, 6, 7 and 8 is a mixer or mixing stage 9. Since the circuitry associated with the various filters is essentially the same in each instance, it will be sufficient for the purposes of this disclosure to describe that for one filter only.

Also coupled to the mixer is an oscillator 10 tuned in the example of this disclosure to 3,800 megacycles. By feeding the signal from the oscillator 10 and the output signal from the filter 4 into the mixer 9, a heterodyned or difference-frequency signal will be produced, this difference-frequency signal occuring in the output line 3a of the filter array 3.

The oscillator for the filter 5 in the instance of the illustrated system is set at 4,000 megacycles, the oscillator for the filter 6 at 4,200 megacycles, and the oscillator for the filter 7 at 4,400 megacycles, with the oscillator for filter 8 at 4,600 megacycles.

As will now appear, the difference-frequency or intermediate frequency signals emanating from the various filter channels 4, 5, 6, 7 and 8, respectively, will fall in the frequency range of 200 to 400 megacycles. This being true, all of the mixer outputs are coupled into the common output channel 3a of the filter array 3, which in turn is coupled to a filter 11 designed to cover the frequency range of 200 to 400 megacycles.

A mixer 12 of conventional design is coupled to the filter 11 and also to an oscillator 13 which is variable in frequency from 200 to 400 megacycles. Coupled to the output circuit of the mixer 12 is a video frequency amplifier 14 which, in the instance of this example, is designed to have a passband of only ten (10) megacycles. The video amplifier 14 in turn is coupled to a sweep terminator 15, the latter in turn being coupled to a sawtooth sweep generator 16. The sawtooth sweep signal from the sweep generator 16 is coupled to the variable frequency oscillator 13 for sweeping the frequency of the oscillator signal cyclically from 200 to 400 megacycles.

Connected to each of the output circuits of the respective circuits 4, 5, 6, 7 and 8 is a suitable detector or rectifier 17, which in turn is connected to an ordinary pilot lamp or the like 18. Whenever one of the filters, for example, filter 4, passes a signal, a portion of the signal energy is rectified and fed to the indicating lamp 18 to provide an indication that the particular filter is receiving a signal. Thus, depending upon which of the indicating lamps of the various filters is lighted, the frequency of the unknown signal will be bracketed to within the bandpass frequency characteristics of that filter.

In operation, the oscillators 9 are set into operation. The sweep generator 16 produces an output signal of sawtooth form, this signal serving to sweep the frequency of the oscillator 13 over the band of 200 to 400 megacycles. Thus, the oscillator signal being fed to the mixer 12 is constantly varying in frequency between these limits.

Assuming that it is desired to now measure the frequency of a signal occurring within the spectrum of 4,000–5,000 megacycles, and further assuming that this unknown signal has a frequency of 4,100 megacycles, it is immediately apparent that only filter 4 will pass this signal, the remaining filters 5, 6, 7 and 8 rejecting the same. Upon passing this unknown signal, the lamp 18 associated with the filter 4 lights, thereby revealing to the observer that the frequency of the unknown signal lies between 4,000–4,200 megacycles. This same signal of unknown frequency (4,100 megacycles) is next fed to the mixer 9 wherein it is heterodyned with the 3,800 megacycle signal of the oscillator 10. This produces a heterodyne or difference-frequency signal of 300 megacycles (the difference between 3,800 megacycles and 4,100 megacycles). This 300-megacycle difference-frequency signal now appears in channel 3a from which it is passed through the filter 11 to the mixer 12. As the signal of the oscillator 13 sweeps through its frequency of 300 megacycles, and even more precisely when the difference between the 300 megacycle signal or filter 11 differs only ten (10) or less) megacycles from the frequency of the signal of oscillator 13, the difference-frequency signal appears in the output circuit of the mixer 12 which is ten (10) (or less) megacycles in frequency. This signal being within the passband capabilities of the video frequency amplifier 14, the latter amplifies the signal and feeds it to the sweep terminator 15. Upon receiving this signal, the sweep terminator stops the cyclical sweep of the sweep generator 16, stabilizing it as indicated by the graph of Fig. 3.

Figure 3:
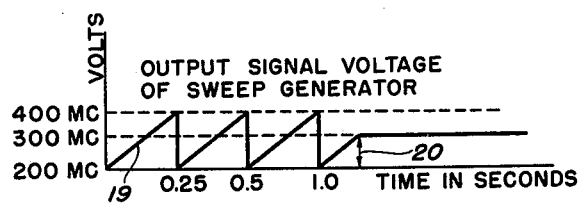
Fig. 3 is a waveform illustration used in explaining the operation of the invention.

In Fig. 3, the sweep generator 16 is shown to have a sawtooth waveform 19 of one-quarter (¼) second duration, the sawtooth repeating until it is terminated at 20 by the sweep terminator 15.

The output signal of the sweep generator 16 is indicated as a sawtooth voltage, this voltage being applied to the oscillator for the purpose of varying the frequency thereof. Any conventional control network may be used for varying the frequency of the oscillator, for example the sawtooth voltage may be used as reactance tube or oscillator bias. Any other method of sweeping the oscillator 13 frequency may be used without departing from the scope of this invention.

With the sweep voltage stabilized to the value indicated at 20 in Fig. 3, the oscillator 13 frequency is set at 300 megacycles, thereby producing a signal which when mixed with the signal from the filter 11 produces a difference-frequency signal within the passband capabilities of the video amplifier 14.

Since the voltage 20 of Fig. 3 represents a particular frequency for oscillator 13, such frequency may be determined by measuring the amplitude of this voltage by means of a suitable voltmeter 21. This voltmeter may be calibrated directly in frequency whereby the frequency at which the unknown signal is occurring in the mixer 12 may be immediately observed.

In the example of this disclosure, the meter 21 is calibrated from zero (0) to two hundred (200) megacycles, representing the span of frequencies over which the oscillator 13 is swept. Thus, when the oscillator generates a signal at 300 megacycles, as in the example just given, this frequency will be one hundred (100) megacycles higher than the lower oscillator limit of two hundred (200) megacycles, whereby the meter 21 will read at half-scale, or, in other words, one hundred (100) megacycles. This figure of 100 megacycles is added to the lower frequency limit of the filter 4, thereby giving as the frequency of the unknown signal the value of 4,100 megacycles.

Figure 2:
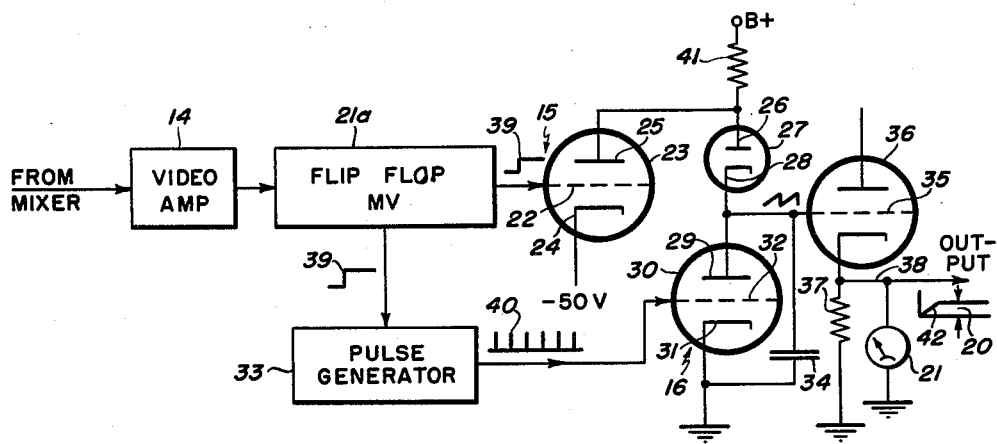
Fig. 2 is a part block and part circuit diagram of a portion of Fig. 1.

While there are any number of available circuit arrangements for use as the sweep terminator 15 and sweep generator 16, the one shown in Fig. 2 illustrates one operative arrangement. In this circuit, the sweep terminator 15 comprises a flip-flop multivibrator 21a which is coupled to the control grid 22 of the triode amplifier 23. This amplifier 23 is biased to cut-off by the application of a suitable negative voltage to the cathode 24. The anode 25 is connected to the anode 26 of a diode 27, the cathode 28 of the latter being connected in turn to the anode 29 of a second triode 30. The cathode 31 is grounded and the control grid 32 is coupled to the output circuit of a pulse generator 33. In addition to the output circuit of the flip-flop multivibrator 21a being connected to the triode 23, a like connection is made to the input circuit of the pulse generator 33.

A charging capacitor 34 is connected between the anode 29 and cathode 31 of the triode 30, the anode 29 being connected to the control grid 35 of the cathode follower 36. A cathode resistor 37 is connected to ground, the output circuit for the cathode follower being indicated by the numeral 38. The voltmeter 21 previously shown in Fig. 1 is connected in shunt with the cathode resistor 37.

In operation, the multivibrator 21a when triggered into operation produces a unidirectional signal voltage of positive polarity as indicated by the numeral 39. The pulse generator 33 normally produces the pulses 40 at a given repetition rate, this rate determining the frequency of the sawtooth voltage 19 (Fig. 3). When the multivibrator 21a produces its signal 39, the pulse generator 33 is switched off.

In explaining the operation of Fig. 2, it should first be assumed that no signal is applied to the antenna 2 of Fig. 1. This being true, the video amplifier 14 produces no output signal. Under this condition, the multivibrator 21a is idling and likewise produces no output signal. The pulse generator 33, however, is producing its pulses 40 at a rate of one (1) each one-fourth (¼) second, which pulses are fed to the control grid 32 of the triode 30. This triode 30, in combination with the capacitor 34, constitutes the sweep generator 16, and with a voltage applied to the anode 26 of the diode 27, a charging current through the anode resistor 41 charges the capacitor 34. This charging action continues until the pulse 40 occurs, at which time the triode 30 (which was formerly cut off) becomes conductive, thereby discharging the capacitor 34 and producing the steep or back side of the sawtooth.

This sawtooth voltage generated over the capacitor 34 is coupled to the cathode follower 36 and appears across the cathode resistor 37 in the output circuit 38.

When a signal of unknown frequency is coupled by some means to the antenna 2 and the signal of the oscillator 13 coincides with the frequency of the heterodyned signal of mixer 12, the video amplifier 14 produces a corresponding signal which is coupled to the multivibrator 21a. This signal triggers the multivibrator into producing the pulse 39 which renders the normally nonconductive triode 23 conductive. This immediately reduces the anode voltage on the diode 27 and triode 30. Simultaneously with rendering the triode 23 conductive, the pulse 39 disables the pulse generator 33 thereby terminating the generation of the pulses 40. Since the charging circuit for the capacitor 34 has now been disabled, and since there are no pulses 40 occurring to discharge the capacitor 34, the latter will hold its charge at the value reached at the time the multivibrator pulse 39 started. This potential on the capacitor 34 is now coupled to the cathode follower 36 which produces an output voltage across the resistor 37 corresponding precisely to that on the capacitor 34. The signal thus occurring in the output circuit 38 appears as illustrated at the one (1) second point in Fig. 3, or as indicated by the reference numeral 42 in Fig. 2. A voltmeter connected across the resistor 37 can now be used to determine the amplitude of the fixed potential appearing across the cathode resistor 37.

As mentioned earlier, the output circuit of the sweep generator, which is indicated by the numeral 38 in Fig. 2, is suitably coupled into the oscillator 13 for controlling the frequency of the latter. Thus, the moment the video amplifier passes a signal, the frequency of the oscillator 13 is stabilized at that figure which will sustain this terminated or stabilized condition.

In certain instances, it is desirable to determine automatically which of the filters 4, 5, 6, 7 and 8 is momentarily passing the strongest received, unknown signal. This may be accomplished by use of an amplitude comparator 43 which is coupled to the output circuits of all the filters 4, 5, 6, 7 and 8, as indicated. This amplitude comparator is of conventional design, and serves only to discriminate the highest amplitude signal occurring in the various filters against the remaining signals of lower amplitude. This amplitude comparator is suitably coupled to a keyer 44 having output circuitry connected to all of the oscillators 10 for the various filter channels. The keyer 44 is designed to produce a bias voltage of disabling character for all of the oscillators and to remove this biasing voltage on that oscillator which is coupled to the filter channel momentarily receiving the strongest signal. Thus, assuming that several unknown signals are being applied to all of the filters 4, 5, 6, 7 and 8 simultaneously, the amplitude comparator 43 will sense the strongest signal and provide a control signal to the keyer 44 which will remove the disabling bias on the oscillator of that particular filter channel. When this happens, the unknown signal will be heterodyned with the oscillator signal producing the intermediate frequency signal for the mixer 12. The remaining features of operation are the same as explained hereinbefore.

In some instances, the signal being passed by the particular filters 4, 5, 6, 7 and 8 may be too weak to excite the respective indicating lamp 18, in which event it is only necessary to insert an amplifier of conventional design in series with the lamp 18 and detector 17 for producing an indicating signal of sufficient power. While the use of an indicating lamp has been disclosed as one method for determining which of the filters is receiving a signal, it will appear as obvious to those persons skilled in the art that other indicating devices may be used instead.

While I have described above the principles of my invention in connection with specific apparatus, it is to be clearly understood that this description is made only by way of example and not as a limitation to the scope of my invention.

What is claimed is:

1. A frequency-determining system comprising a plurality of bandpass filters which conjointly cover a first predetermined band of frequencies, said filters individually having response characteristics which cover different portions of said band, respectively, heterodyning means associated with each filter for providing an intermediate frequency signal lying within a second predetermined band of frequencies, variable frequency means for generating a signal of variable frequency within said second band, means for mixing said variable frequency signal with said intermediate frequency signal to obtain a difference-frequency signal, and means responsive to said difference-frequency signal for controlling and determining the frequency of said variable frequency means whereby the frequency of said intermediate frequency signal can be determined.

2. A frequency-determining system comprising a plurality of bandpass filters which conjointly cover a first predetermined band of frequencies, said filters individually having response characteristics which cover different portions of said band, respectively, heterodyning means associated with each filter for providing an intermediate frequency signal lying within a second predetermined band of frequencies, variable frequency means for generating a signal of variable frequency within said second band, means for mixing said variable frequency signal with said intermediate frequency signal to obtain a difference-frequency signal, means responsive to said difference-frequency signal for generating a control signal, means for coupling said control signal to said variable frequency means for controlling the frequency of the latter, and utilization means responsive to said control signal for determining the frequency of said variable frequency means.

3. A frequency-determining system comprising a plurality of bandpass filters which conjointly cover a first predetermined band of frequencies, said filters individually having response characteristics which cover different portions of said band, respectively, heterodyning means associated with each filter for providing an intermediate frequency signal lying within a second predetermined band of frequencies, variable frequency means for generating a signal of variable frequency within said second band, sweep means for sweeping cyclically the signal of said variable frequency means over said second band of frequencies, means for mixing said variable frequency signal with said intermediate frequency signal to obtain a difference-frequency signal, and sweep-terminating means responsive to said difference-frequency signal for stopping the sweep of said sweep means when the signal of said variable frequency means coincides in frequency with the intermediate frequency signal.

4. The system of claim 1 and including means for determining which of said filters is actuated.

5. The system of claim 1 and including means for selectively disabling the heterodyning means of said filters.

6. A frequency-determining system comprising a plurality of shunt-connected signal-passing channels having input and output circuits, filtering means in said channels respectively, the filtering means of each channel covering a different band of frequencies, heterodyning means in each channel for resolving the signal frequency thereof into a common intermediate frequency band, signal-mixing means coupled to said output circuits, a variable oscillator coupled to said signal-mixing means for producing a difference-frequency signal, a sweep-generating means for cyclically varying the frequency of said oscillator, and sweep-terminating means responsive to said difference-frequency signal for terminating the sweep of said sweep-generating means.

7. The system of claim 6 wherein all of the channels cover a spectrum of predetermined bandwidth and the filtering means of each channel covers equal increments of said bandwidth.

8. The system of claim 6 wherein each channel includes a mixer and oscillator, the mixer being coupled to the filtering means for producing an intermediate frequency signal.

9. The system of claim 6 and including channel-indicating means associated with each channel and responsive to a signal being passed by the respective channel for indicating the presence of said signal.

References Cited in the file of this patent

UNITED STATES PATENTS

| | | |
|---|---|---|
| 2,083,239 | Oosterhuis | June 8, 1937 |
| 2,186,182 | Stocker | Jan. 9, 1940 |
| 2,507,525 | Hurvitz | May 16, 1950 |
| 2,525,679 | Hurvitz | Oct. 10, 1950 |
| 2,577,758 | Hastings | Dec. 11, 1951 |
| 2,654,843 | McCoppin | Oct. 6, 1953 |
| 2,741,696 | Foot | Apr. 10, 1956 |

FOREIGN PATENTS

| | | |
|---|---|---|
| 907,665 | Germany | Mar. 29, 1954 |